Aug. 19, 1969
E. H. LAND
3,462,222
STEREOSCOPIC RANGE FINDER INCLUDING
SEQUENTIALLY ILLUMINATED RETICLES
Filed Sept. 2, 1966
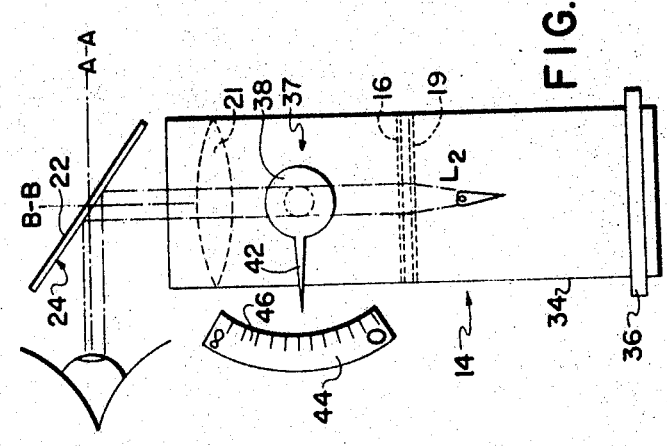
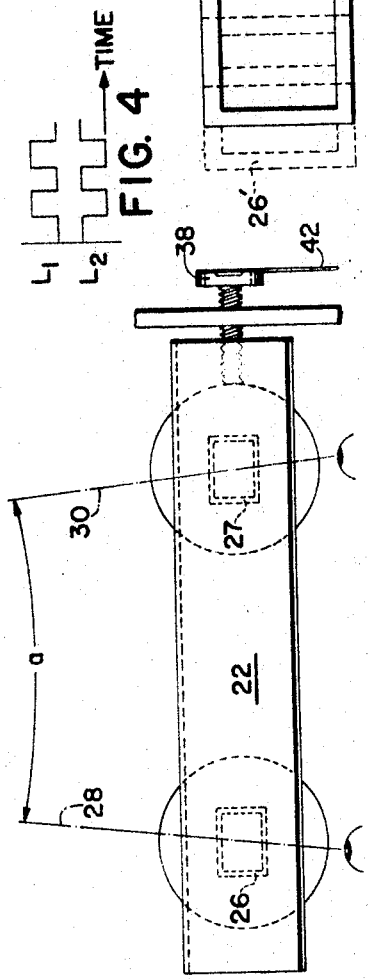
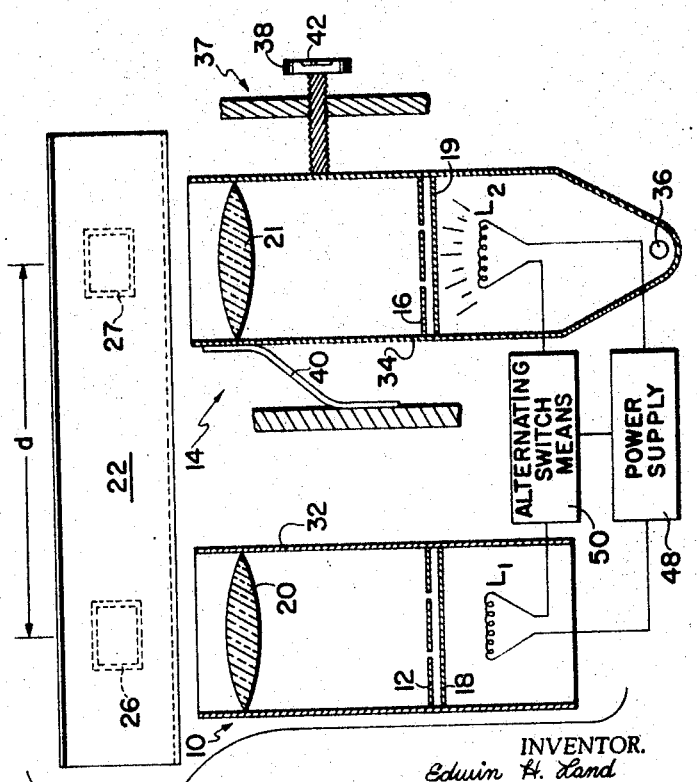
INVENTOR.
Edwin H. Land
BY Brown and Mikulka
and
John H. Coult
ATTORNEYS

United States Patent Office 3,462,222
Patented Aug. 19, 1969

3,462,222
STEREOSCOPIC RANGE FINDER INCLUDING
SEQUENTIALLY ILLUMINATED RETICLES
Edwin H. Land, Cambridge, Mass., assignor to Polaroid
Corporation, Cambridge, Mass., a corporation of
Delaware
Filed Sept. 2, 1966, Ser. No. 576,921
Int. Cl. G01c 3/14
U.S. Cl. 356—12                                14 Claims This invention relates to rangefinders, and more particularly to a binocular rangefinder for determining the range of an object in a scene upon which the sight lines of a user's eyes are converged.

Binocular rangefinders have been devised in the past which include optical means providing discrete left and right eye reticle images and range-determining means for adjusting the apparent separation on the left and right eye images while the eyes are focussed and converged on an object in a field of view such that a range determination of the object may be obtained with the range-determining means when the images are brought into apparent coincidence in the field of view. In such binocular rangefinders the left and right eye reticle are interpreted by the user's nervous and visual sensory systems as a stereo pair of images of one world object. The natural reaction of the nervous system is to alter the ocular convergence angle and, thus, the apparent separation of the images, in search of an angle at which the images appear to coincide. When apparent coincidence of the images is achieved, the system is satisfied that both eyes are converged on an object in the scene which has the configuration of the reticle images and which is located at the vertex of the ocular convergence angle. The described condition wherein apparent coincidence of the reticle images is achieved is referred to hereinafter as the condition wherein the user has converged his eyes upon the reticle images.

Such rangefinders are satisfactory if the user is able during the ranging operation to fix his eyes constantly upon the world object to be ranged. However, it has been found to be difficult for the user of such rangefinders to resist the involuntary urge to converge his eyes upon the reticle images rather than upon the world object. When this happens, of course, the convergence angle of the eyes no longer corresponds to the ranged object and the ranging ability of the device is affected.

This invention contemplates the provision of a binocular rangefinder of the general type described above which includes means for inhibiting any such involuntary attempt on the part of the user to converge his eyes upon the reticle images.

Accordingly, it is an object of this invention to provide a binocular rangefinder for ascertaining the range of an object in a scene upon which the sight lines of a user's eyes may be converged, having means for imposing upon a field of view common to both eyes a first reticle image observable exclusively by one eye and a second reticle image observable exclusively by the other eye, and having means for inhibiting the tendency of a user to attempt to converge his eyes involuntarily on the two reticle images. It is another object to provide such a rangefinder for use with a photographic viewfinder, wherein the reticle images are configured and arranged to delimit generally rectangular areas on the field of view presented by the viewfinder serving, when brought into coincidence, to frame an exposable area of the field.

It is a further object of this invention to provide a binocular rangefinder for ascertaining the range of an object in a scene upon which the sight lines of a user's eyes may be converged, which rangefinder is highly accurate and capable of being operated rapidly and with great ease.

Briefly, one structural implementation of the rangefinder concepts of the present invention may comprise optical means including reticle means for imposing on a field of view common to both eyes of a user a first reticle image observable exclusively by one eye and a second reticle image observable exclusively by the other eye, the apparent separation between the first and second images being a function of the convergence angle of the eyes. Alternator means are provided for making the images visible alternately at a rate effective to inhibit a tendency of the user to converge his eyes involuntarily upon the images rather than upon the object to be ranged in the field of view. Range-determining means are utilized for varying the apparent separation between the reticle images such that at any of various convergence angles of the eyes corresponding to selected ranging distances, the apparent separation between the images may be reduced to zero to provide a range indication.

Other objects of this invention will in part be obvious and will in part appear hereinafter.

The invention accordingly comprises the apparatus possessing the construction, combination of elements, and arrangement of parts which are exemplified in the following detailed disclosure and the scope of the application of which is indicated in the claims.

For a fuller understanding of the nature and objects of the invention, reference should be had to the following detailed description taken in connection with the accompanying drawing wherein:

FIGURE 1 is a diagrammatic front elevation view, partially sectioned, of a binocular rangefinder which may be constructed in accordance with the principles of the invention;

FIG. 2 is a top view of the rangefinder illustrated in FIG. 1;

FIG. 3 is a side elevation view of the rangefinder shown in FIGS. 1 and 2;

FIG. 4 is a time vs. energization diagram illustrating the phase relationship of the energization of lamps $L_1$ and $L_2$ in the rangefinder of FIGS. 1–3; and FIGS. 5(a)–5(b) illustrate exemplary right and left eye reticle images which may be employed in the practice of the invention, the images shown in solid lines representing the apparent coincidence of the broken-line right and left eye images as seen by a user of the rangefinder.

This invention concerns a rangefinder of the general type whose operation depends upon the binocular nature of a user's vision. It is well known that convergence of the sight lines of the eyes upon a particular world object establishes a convergence angle between the lines of sight of the left and right eyes which is unique for the range of the selected object. Binocular rangefinders have been devised previously which utilized the convergence angle of the eyes for ranging purposes, for example, as depicted in my earlier U.S. Patents Nos. 2,397,273; 2,397,274; 2,404,302; and 2,407,306. These patents broadly teach the concept of a binocular rangefinder including optical means for providing similar left and right eye reticle images and range-determining means for altering the real and apparent displacement of the images. Utilizing the fact that the apparent displacement of the reticle images is a function of the convergence angle of the eyes, it is shown in these patents that the range-determining means may be used to bring the left and right eye reticle images into apparent coincidence such that the setting of the range-determining means at the condition of apparent coincidence of the images yields an indication of the range of the particular object upon which the user's eyes were fixed during the ranging operation.

In the use of such binocular rangefinders it has been found, as discussed above, that the user may find it difficult to overcome an involuntary tendency to remove his visual attention from the object to be ranged and to attempt to converge his eyes upon the reticle images. Thus the practical usefulness of such rangefinders may be limited by the inability of a user to overcome this tendency to converge his eyes upon the reticle images during a ranging operation.

By this invention, means are provided for rendering the left and right eye reticle images visible alternately. By alternating the visibility of the images, the delay in the response of the nervous and ocular motive systems to sudden shifts in the viewed point is exploited. This response delay may be likened to the inertial effects of mass in physical systems, and may, in fact to a degree include such inertial effects due to the mass of the eyeballs and their motive structures. The rate at which the visibility intervals of the reticle images are alternated is preferably rendered sufficiently rapid that such inertial and response delay effects inhibit the tendency of the user to attempt to converge his eyes upon the reticle images.

Diverse structures may be devised by one skilled in the art to implement the principles of the invention. A preferred embodiment of the invention is illustrated schematically in FIGS. 1–3, comprising first optical means including a reticle 12 for imposing a first reticle image upon the field of view of one eye and second optical means 14 including a reticle 16 for imposing a second reticle image upon the field of view presented to the other eye.

For convenience of description, it may be assumed that the first optical means 10 presents a reticle image to the user's left and that the second optical means 14 forms a reticle image to be viewed by the user's right eye. The optical means 10, 14 present reticle images visible on a field of view common to the left and right eyes. The left and right eye images are presented so as to be observable exclusively by the left and right eyes respectively, as will be described more fully hereinafter.

Numerous optical arrangements may be devised for rendering the reticles 12, 16 visible to the operator of the rangefinder. In the illustrated preferred arrangement, the first and second optical means may comprise, respectively, lamps $L_1$ and $L_2$ for illuminating reticles 12 and 16 through diffusing members 18 and 19. Short-focus lenses 20 and 21 may be provided for enabling the eye to focus upon the reticle 12. A transparent but partially reflective planar member 22 may be provided for imposing on the field of view of the user's eyes the images 26, 27 of reticles 12 and 16. The transparent member 22 may have a smooth semireflective surface 24 angled with respect to a world optical axis A—A and also with respect to an image optical axis B—B such that light transmitted from reticles 12, 16 along axis B—B is reflected into the user's eye along axis A—A.

The apparent separation of the reticle images 26, 27 is a function of the relative location of the reticle images 26, 27 in the left and right eye retinal images, which is, in turn, dependent upon the relative location of the reticle images 26, 27 with respect to the sight lines 28, 30 of the left and right eyes respectively. In FIG. 2 the reticle images 26, 27 are centered on the respective sight lines 28, 30 and thus would appear to coincide.

It is evident that the condition of apparent coincidence of the reticle images 26, 27 may be produced if the images 26, 27 are offset from the respective sight lines 28, 30 by a corresponding distance and in the same direction. Thus, the operation of the described rangefinder is not restricted as to where in the field of view the reticle images 26, 27 may be brought into apparent coincidence.

In the illustrated preferred embodiment, the condition of apparent coincidence of the reticle images 26, 27 for a given real separation $d$ of the images 26, 27 on the transparent member 22 is associated with a unique ocular convergence angle $a$. If the eyes are converged at any other angle, the reticle images 26, 27 will appear to separate laterally. Or, stated in another way, there is only one ocular convergence angle which corresponds to the distance from the rangefinder to a selected world object to be ranged. There is but one real separation distance $d$ in the illustrated embodiment for a given ocular convergence angle at which the reticle images 26, 27 will appear to coincide. Thus, in a properly calibrated system, the real image separation distance $d$ may be utilized as an indication of the range of the object upon which the sight lines 28, 30 of the user's eyes are converged.

Apparatus constructed in accordance with the invention may include range-determining means for adjusting the real separation distance $d$ and thus the apparent separation of the reticle images 26, 27. In order to render the reticle images 26, 27 movable relative to each other, the positions of either or both of the images 26, 27 may be adjusted. In the illustrated embodiment the first optical means 10 is held in a fixed position relative to the second optical means 14, and the second optical means 14 is rendered relatively movable.

For the purpose of supporting lamp $L_1$, diffusing member 18, reticle 12 and lens 20, in a fixed position and in order to optically segregate the first and second optical means 10, 14, a tubular housing 32 may be provided.

The second optical means 14 may be rendered adjustable by mounting lamp $L_2$, reticle 16, diffusing member 19 and eyepiece 21 in a tubular housing 34 supported for angular adjustment on a pin 36.

Range-determining means 37 are provided for translating adjustments in the separation between reticle images 16, 17 into useful range determinations. The range-determining means 37 may include adjustable means such as screw 38 for displacing the free end of the housing 34 against the bias of a leaf spring 40 acting upon a diametrically opposite point on the housing 34. The screw 38 may be provided with a radially oriented pointer 42 addressing a distance scale 44 carrying indicia means 46.

As will become more evident below, by properly calibrating the screw 38 and the other relevant parameters in the apparatus, range indications may be read directly off the distance scale 44. It should be understood, of course, that the rangefinder of the present invention may be incorporated in a photographic camera, in which case adjustments in the position of the reticle images 26, 27 would preferably be coordinated directly with focus adjustments of the objective lens means for the camera.

Many different arrangements may be employed for rendering the reticle images 26, 27 alternately visible in accordance with the present invention. In the illustrated embodiment lamps $L_1$ and $L_2$ are alternately energized from a power supply 48 through alternating switch means 50. The switch means 50 may take many forms. For example, it may comprise a manually rotatable switching member for alternately connecting lamps $L_1$ and $L_2$ through the power supply 48. The switching member may take the form of a flywheel set in motion before a ranging operation by a finger-actuated drive mechanism. In another arrangement the alternating switch means 50 may take the form of a bi-stable flip-flop switching circuit.

The diagram in FIG. 4 illustrates one phase relationship which the alternating switch means 50 may establish between the energization of lamp $L_1$ and lamp $L_2$. The diagram shows the lamps $L_1$ and $L_2$ as being energized periodically and without a break beween the termination of the energization of one lamp and the initiation of the energization of the other lamp. It should be understood, however, that it is the alternating nature of the visibility of reticle images 26, 27 which is important, and it is unnecessary that the visibility intervals of the images 26, 27 be either periodic or without interruption.

In operation, the user need merely energize the lamps $L_1$ and $L_2$ through the alternating switch means 50 and look at the distant object through the transparent member 22. He thus converges the sight lines of his eyes upon the object in the scene to be ranged. Ordinarily, when initially viewing the world object to be ranged, the alternately visible reticle images 26, 27 appear to be separated, indicating that the range-determining means 37 is not properly set to accurately indicate the range of the viewed object. The user then manually adjusts the range-determining means, in the illustrated embodiment by rotating the screw 38, so that the reticle image 27 on member 22 is displaced with respect to reticle image 26. Accordingly, the apparent displacement between the reticle images 26, 27 is also altered. If the reticle images are identical, the user will have the impression of a single reticle image oscillating on the field of view between the extremes of the apparent displacement between the images.

The above-described inertial and response delay effects in the user's nervous and ocular systems have an inhibiting effect on an involuntary tendency of many individuals to attempt to coverage his eyes upon the apparently oscillating reticle image. Preferably the rate at which the visibility intervals of the reticle images are alternated should be sufficiently great for the inertial impedance of the movement of the user's eyeballs to be a significant factor. In practice it has been found that a rate of alternation as low as two or less alternations per second is satisfactory.

The rangefinder of the present invention may be advantageously adapted for incorporation into or attachment upon a photographic camera. In such a photographic embodiment, the ranging operation and the location of the field of view may be effected simultaneously if the reticles 12, 16 are configured to define generally rectangular reticle images, as shown in FIG. 5(a) at 26', 27'. The reticle images 26', 27' are preferably of a size appropriate for delimiting the average portion of the field of view to which the photosensitive material in the associated camera may be exposed.

In a photographic environment, as described above, the user will have the impression of a single bright rectangle shifting suddenly back and forth across his field of view. The user rotates the screw 38 in the appropriate direction until the reticle images 26', 27' coincide, that is, until the user has the impression that the reticle image has stopped oscillating on his field of view. The user then utilizes the apparently stationary rectangular reticle image to frame the portion of the field which he wishes to record.

If the lamp energization phase relationship is as depicted in the FIG. 4 diagram wherein the initiation of the visibility interval of one lamp is coextensive in time with the termination of the immediately preceding visibility interval of the other lamp, the alternately visible reticle images give the appearance of a single, immovable image continuously visible in the user's field of view.

Assuming a proper calibration of the screw 38 with the distance scale 44 and the other parameters in the apparatus, the range of the object upon which the eyes were converged during the ranging operation can be read directly off the pointer 42 on distance scale 44.

FIG. 5(b) illustrates reticle images which may be formed by an alternate reticle configuration. If reticles presenting the dissimilar reticle images shown in FIG. 5(b) are used, the user would be indicated that he has determined the proper range when he has apparently located the circular reticle image 26" around the X-shaped image 27".

Certain changes may be made in the above apparatus without departing from the scope of the invention herein involved. For example, it is within the capability of one skilled in the art to devise other structures for presenting a first reticle image observable exclusively by one eye and a second reticle image observable exclusively by the other eye and other means for causing the visibility of the first and second reticle images to occur alternately. It is possible to arrive at alternative arrangements for effecting relative movement of one or the other or both of the reticle images so as to effect a change in the apparent separation between the images. Other range-determining means may be devised. It is manifest that numerous reticle configurations may be devised other than those capable of producing the reticle images shown in FIGS. 5(a)–5(b). It is therefore intended that all matter contained in the above description or shown in the accompanying drawing shall be interpreted as illustrative and not in a limiting sense.

What is claimed is:

1. A binocular rangefinder for determining the range of an object in a scene upon which the sight lines of a user's eyes may be converged, comprising:

optical means including reticle means for imposing on a field of view common to both eyes a first reticle image observable exclusively by one eye and a second reticle image observable exclusively by the other eye such that the apparent separation between said first and second images is a function of the ocular convergence angle;

means for making said images alternately visible; and range-determining means coupled to said optical means for varying the apparent separation between said images such that at any convergence angle of the eyes corresponding to a selected ranging distance the apparent separation between said images may be reduced to zero to provide a range determination.

2. The apparatus defined by claim 1 wherein the alternation in the visibility of said images is periodic.

3. The apparatus defined by claim 1 wherein the initiation of an interval of visibility of one of said images is substantially coextensive in time with the termination of the immediately preceding visibility interval of the other image.

4. The apparatus defined by claim 1 wherein said reticle means defines first and second reticle images appearing similar in configuration so as to create the visual impression of a single reticle image superimposed upon said field of view and oscillating between the extremes of said apparent image separation.

5. The apparatus defined by claim 1 wherein said first and second reticle images defined by said reticle means delimit generally rectangular areas, said images when brought into coincidence by said range-determining means serving to define an area on said field of view.

6. The apparatus defined by claim 1 wherein said optical means includes first optical means for forming said first image and second optical means for forming said second image, at least one of said first and second optical means comprising a reticle, a light source for rendering said reticle visible, a short-focus lens, and a transparent optical member through which a scene may be viewed along a first optical axis, said optical member having a semi-reflective surface angled with respect to said first optical axis and a second optical axis from said reticle to said member so as to impose an image of said reticle on the field of view.

7. The apparatus defined by claim 6 wherein said reticle and said short-focus lens are carried by pivotable mounting means, said range-determining means includes adjustable means operating on said mounting means for adjusting the orientation of said second optical axis to effect a real and apparent displacement of the respective reticle image.

8. The apparatus defined by claim 7 wherein said mounting means comprises a hollow cylindrical member and wherein said short-focus lens, said reticle and said light source are co-axially arranged in said member.

9. The apparatus defined by claim 8 wherein said means for making said images alternately visible renders said first and second images visible for approximately equal time intervals, the initiation of an interval of visibility of one of said images being substantially coextensive in time with the termination of the immediately preceding visibility interval of the other image.

10. The apparatus defined in claim 9 wherein each of said first and second optical means includes an electrical lamp for rendering visible respective first and second reticles, and wherein said means for making said images alternately visible comprises electrical switching means for effecting an alternate energization of said lamps.

11. The apparatus as defined in claim 10 wherein said reticle means defines first and second reticle images appearing similar in configuration so as to create the visual impression of a single reticle image superimposed upon said field of view and oscillating between the extremes of said apparent image separation.

12. The apparatus as defined by claim 11 wherein said first and second reticle images defined by said reticle means delimit generally rectangular areas, said images when brought into coincidence by said range-determining means serving to define an area on said field of view.

13. A binocular rangefinder comprising:
binocular viewing means for observing a field of view;
first optical means for imposing on said field of view as seen exclusively by one eye of a user an image of a reticle;
second optical means for imposing on the field of view as seen exclusively by the other eye of the user a separate image of a reticle, the apparent displacement between said images being a function of the angular convergence of the eyes;
means for making said images alternately and sequentially visible to create the visual impression of a single reticle image superimposed upon said field of view and oscillating between the extremes of said apparent displacement; and
range-determining means for varying the relative displacement between the images presented by said first and second optical means to alter the apparent displacement between said images.

14. A binocular rangefinder comprising:
viewing means for observing a field of view binocularly;
means for presenting a pair of similar reticle images uniquely visible to the left eye and right eye, respectively, and superimposed on the field of view such that the apparent displacement between said images is a function of the angular convergence of the eyes;
means for making said images alternately and sequentially visible to create the visual impression of a single reticle image superimposed upon said field of view and oscillating between the extremes of said apparent displacement; and
range-determining means for varying the relative displacement between the reticle images to alter the apparent displacement between said images.

References Cited

UNITED STATES PATENTS

| | | |
|---|---|---|
| 2,397,273 | 3/1946 | Land. |
| 2,404,302 | 7/1946 | Land et al. |
| 2,482,822 | 9/1949 | Zaroodny. |
| 2,918,855 | 12/1959 | Wilkenson. |

RONALD L. WIBERT, Primary Examiner

ORVILLE B. CHEW II, Assistant Examiner

U.S. Cl. X.R.

356—8